Patented July 6, 1926.

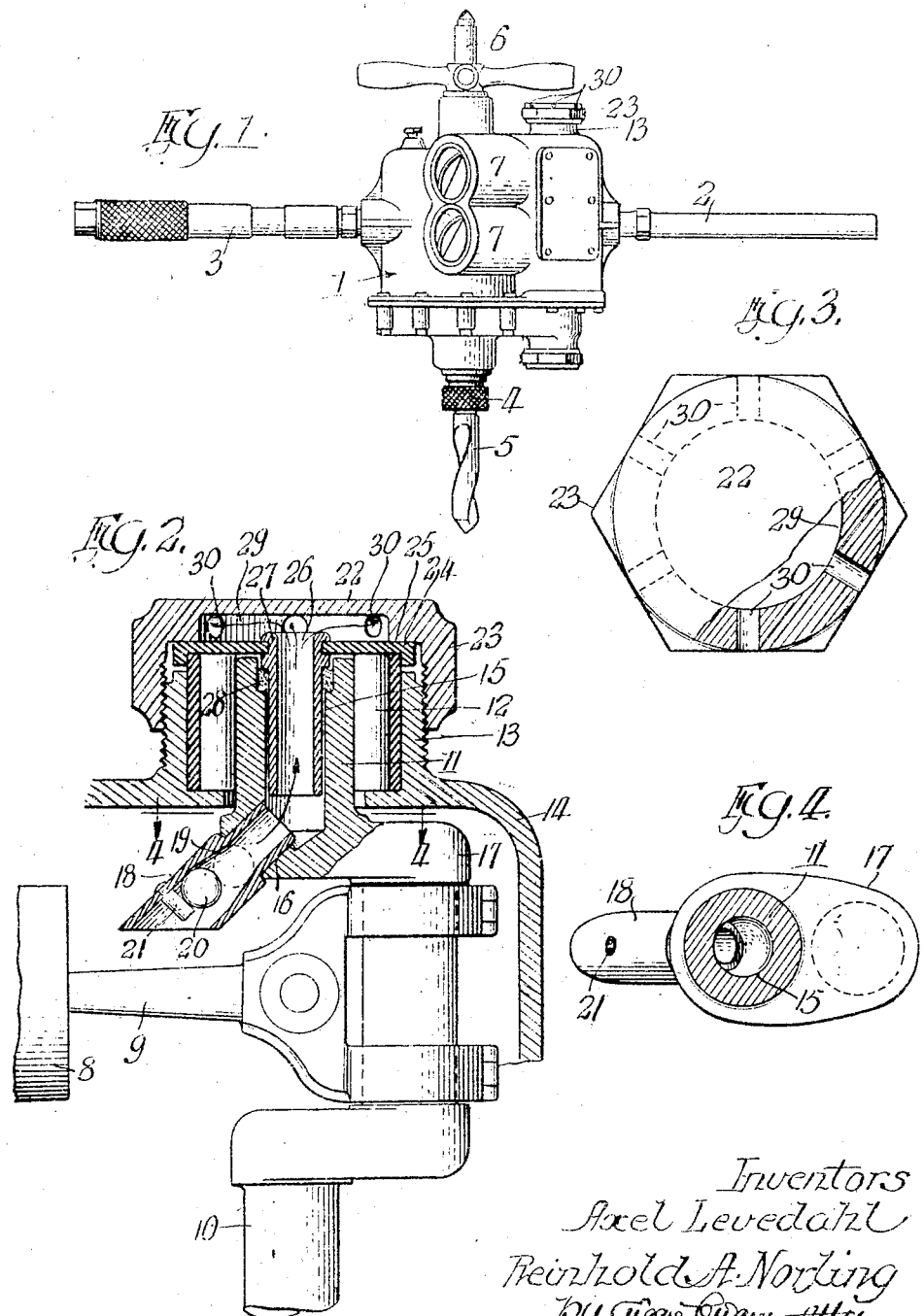

1,591,539

UNITED STATES PATENT OFFICE.

AXEL LEVEDAHL AND REINHOLD A. NORLING, OF AURORA, ILLINOIS, ASSIGNORS TO INDEPENDENT PNEUMATIC TOOL COMPANY, OF CHICAGO, ILLINOIS, A CORPORATION OF DELAWARE.

CRANK-CASE-VENTING MEANS FOR PNEUMATIC TOOLS.

Application filed November 8, 1923. Serial No. 673,469.

This invention relates to air venting means for crank cases of piston actuated portable pneumatic drills and like tools.

Tools of this type have single-acting pistons and the cylinder bores open into the crank case. The crank and gear cases being united, all the moving parts are lubricated by simply filling the gear and crank cases with suitable lubricant, mostly slow flowing oil or grease, and lubrication of the parts is effected by what is called a "splash system." These tools in operation are placed and held in various positions, up, down, horizontal, and at angles, depending on the lay of the work. It therefore follows that the lubricant from gravity accumulates in various places according to the positions of the tool. The inner end of the valve mechanism opens into the gear case and compressed air used in operating the tools leaks into the crank case from the pistons and valves. Unless prevented, there would be an undesirable accumulation of air pressure in the crank case. Should a plain hole be made in the crank case for venting purposes, there would always be some position of the tool where the lubricant would cover the hole and be forced out of the case as the pressure therein increased.

The main object of our invention is to avoid this difficulty by providing a venting means allowing air to escape, yet keeping the lubricant back.

Another object of our invention is to apply the air venting means to the crank shaft and use the centrifugal forces set up on its rotation to throw the lubricant, which is heavier than air away from the venting means, thus allowing the air to escape but preventing the lubricant following.

A further object of our invention is to employ in the air vent a valve device which will automatically close to prevent the escape of lubricant therethrough whenever the tool is held or placed while idle in a position allowing the lubricant to collect by gravity on and about the vent means.

Other and further objects and advantages of our invention will appear from the following specification, in connection with the accompanying drawings, in which:—

Fig. 1 is a side view of a portable piston actuated air drill having incorporated therein an air venting means of our invention;

Fig. 2 is an enlarged fragmentary vertical sectional view taken through the upper end of the crank shaft and its case to show in detail the air venting structure;

Fig. 3 is a top plan view, partly in horizontal section, of the cap of the air venting structure; and Fig. 4 is a horizontal sectional view taken on line 4—4 of Fig. 2.

Fig. 1 shows a portable pneumatic drill of the type to which our invention is particularly applicable. This tool has an outside case 1 carrying on one side a handle 2 and on the other side a combined handle and throttle valve 3, through which compressed air is supplied to the tool for operating the same. The spindle chuck 4 at one end of the tool carries a twist drill 5. At the opposite end of the tool there is a screw feed 6, as usual in tools of this character. The case 1 is provided on each side with a pair of parallel cylinders 7, 7, only one pair being shown in the drawings. These cylinders are arranged V-type, and in them work single-acting pistons 8 (only one being shown) connected by connecting rods 9 to a crank shaft 10, the latter construction being illustrated in Fig. 2.

When drilling downward, as shown in Fig. 1, the crank shaft 10 is upright or vertical, as in Fig. 2, and has its upper end journal 11 in an antifriction bearing 12 of the roller type in the top extension or lug 13 on the crank case 14. The latter is a part of or is carried by the case 1 of the drill, depending on the design of the same.

The end journal 11 is made hollow or drilled out to provide a central passage or bore 15 opening outward through the upper end of the journal. The lower end of the passage 15 communicates with a hole 16 drilled or otherwise formed in the arm 17 of the crank shaft adjoining the crank journal 11. The hole 16 is preferably made at an angle to the crank journal 11, of about 45°, and is of a size to receive the inner end of a short tube 18, which extends toward and terminates short of its adjacent connecting rod 9 so as to be free of the latter.

The passageway through the tube 18 is provided intermediate its ends with a restricted portion forming a valve seat 19 for a ball valve 20. Said ball valve 20 is prevented from dropping out of the outer open end of the tube 18 by a stop pin 21 carried by the tube and extending part way across the passageway thereof, as shown.

The extension 13 is open at its upper end to permit the assembly of the crank journal 11 and its antifriction bearing 12. Said extension 13 is closed by a cap 22 provided in its skirt part 23 with internal screw threads to engage external screw threads on the lug or extension 13. Over the bearing 12 is placed a disc-shaped plate 24 held in place by an annular shoulder 25 on the inside of the cap 22, as shown in Fig. 2. This plate 24 also extends over the upper end of the crank journal 11 and forms an end thrust plate for the crank shaft and its bearing 12.

The end plate 24 is apertured at its center to receive a tube 26 attached to the same permanently, as by having the edge of the plate 24 around the aperture engage in an annular channel 27 at the adjacent end of the tube. Said tube 26 extends down into the bore 15 in the crank journal 11 and terminates adjacent the inner end of the tube 18, as shown in Fig. 2. The screw cap 22, end plate 24, and tube 26 are held stationary. A packing 28 may be used around the tube 26 and the crank journal 11, as shown. The shoulder 25 spaces the top portion of the cap 22 from the upper end of the tube 26 and provides an air receiving chamber 29 which opens to the atmosphere through one or more exhaust holes or ports 30 in the cap, as shown in the drawings.

In use, the drill may be held in various working positions, depending on the lay of the work. When the drill is held in the position shown in Figs. 1 and 2, the end journal 11 is uppermost and the drill bit 5 and the vent tube 18 both extend downward with the stop pin 21 below the ball valve 20. In this position, when the drill is idle, the ball valve 20 will automatically unseat and come to rest against the stop pin 21 by the force of gravity. When the drill is operated in this position, centrifugal forces which are set up by the rotation of the crank shaft 10 will also co-operate to retain the valve 20 in its unseated position and allow for venting of the crank case through the open tubes 18, 26 and the outlet ports 30 in the cap 22.

When the tool is held in its inverted position, that is, with the end journal 11 lowermost, the drill bit 5 and the tube 18 will both point upward. In this position, the ball valve 20 will, when the drill is idle, automatically seat itself and close the vent by the force of gravity. When the tool, however, is operated in this inverted position, centrifugal forces which are set up by rotation of the crank shaft 10 will automatically unseat the valve and retain the latter in its unseated position against the stop 21 during the operation of the drill for venting of the crank case through the open tubes as before.

When the drill is held in a position with the drill bit 5 and crank shaft 10 horizontal, the end journal 11 will be likewise disposed, and the valve 20 will automatically seat by gravity should the crank shaft be stopped with the tube 18 above the axis of the shaft. Starting the drill with the crank shaft in this position, the valve 20 will be automatically unseated to open the vent by centrifugal forces set up on the rotation of the crank shaft. Should the crank shaft be stopped while the tool is held in this horizontal position with the tube 18 below the axis of the shaft, the ball valve will automatically unseat by gravity, and in starting the drill from this position of the tube 18, centrifugal forces set up on the rotation of the crank shaft will co-operate with gravity to hold the valve 20 open and vent the crank case.

Should the drill be held in any position at an angle, either up or down, to the several specified positions mentioned, the valve 20 will become automatically unseated either by gravity or centrifugal forces, depending on whether the tube 18 extends upward or downward, as will be apparent; centrifugal forces, however, playing an important part in either automatically unseating the valve or co-operating with gravity to retain the valve unseated during the operation of the tool should the crank shaft be started from a position with the valve initially opened by gravity.

By connecting the tube 18 to the crank 17 at an angle of substantially 45° to the axis of the shaft 10 (as shown in Fig. 2), a longer tube may be used in the clearance space between the crank 17 and the adjacent connecting rod 9. This better accommodates the valve 20 and permits the same to be larger than if a shorter tube parallel to the axis of the shaft was used. This arrangement of the tube adapts it to a tool of this kind, and it is carried in position not hindering the operation of the adjacent moving parts. The lubricant being heavy will not be forced out with the air because any lubricant that may collect in or on the tube 18 will be thrown off the same into the crank case by centrifugal force. This will follow even when the drill is turned in positions with the crank journal 11 downward. If the drill is stopped in such position, the ball valve 20 will automatically move to its seat 19 by gravity and close the tube 18 to the passage of lubricant, as indicated by dotted lines in Fig. 2.

The provision of the tube 18 has also another and important advantage. The tool can not be completely filled or packed with lubricant, so working in an upright position there is a tendency for the lubricant to accumulate at the bottom of the crank case, leaving the upper connecting rod bearing dry. When the tool is operating in the position shown in Fig. 1 the air current created by our invention moves toward the top of the tool carrying the lubricant toward the upper connecting rod bearing and the crank journal 11. This action of the air has a tendency of keeping the lubricant or a portion of it toward the upper end of the tool, therefore maintaining lubrication of the upper connecting rod bearing and preventing it from becoming dry as heretofore. This is particularly important for the reason that the tool is generally operated downward or horizontally.

While we have shown and described herein in detail an air venting means of our invention, it is of course to be understood that the details of structure and arrangement of parts may be variously changed and modified without departing from the spirit and scope of our invention.

We claim as our invention:

1. In a piston actuated pneumatic tool, the combination with a crank case, of a crank shaft therein, and means including a valve for venting the crank case through the crank shaft, said valve being opened by centrifugal forces set up on rotation of said crank shaft.

2. In a piston actuated pneumatic tool, the combination with a crank case, of a crank shaft in said case and having an end journal supported therein, and means for venting the crank case through the end journal of said shaft embracing an air outlet passage in the end journal, and a valve controlling said passage, said valve being carried by said shaft and being automatically unseated by centrifugal forces set up on the rotation of the shaft.

3. In a piston actuated pneumatic tool, the combination with a crank case, of a crank shaft in said case and having an end journal supported therein, and means for venting the crank case through the end journal of said shaft embracing an air outlet passage in the end journal, a tube in the crank case and fixed to the shaft at the end journal, said tube having a valve seat therein and opening into said outlet passage, and a valve in said tube and being automatically unseated by centrifugal forces set up on the rotation of said shaft.

4. In a piston actuated pneumatic tool, the combination with a crank case, of a crank shaft in said case and having an end journal therein, and means for venting the crank case through the end journal of said shaft embracing an air outlet passage in the end journal, a tube in the crank case and fixed to the shaft at the end journal, said tube having a valve seat therein and opening into said outlet passage, a valve in said tube and being automatically unseated by centrifugal forces set up on the rotation of said shaft, and a stop in the tube to limit the unseating movement of the valve.

5. In a piston actuated pneumatic tool, the combination with a crank case having a tubular extension at one end, of a crank shaft in said crank case and having an end journal in said extension, said end journal having an air vent passage opening at its ends to the atmosphere and to the interior of the crank case, respectively, a tube in said case and fixed to the shaft at said end journal, said tube having a valve seat therein and opening into said passage, and a valve in said tube and being automatically unseated by centrifugal forces set up on the rotation of the crank shaft.

6. In a piston actuated pneumatic tool, the combination with a crank case having a tubular extension at one end, of a crank shaft in said case and having an end journal in said extension, a cap closing the extension and provided with one or more air outlet ports, said end journal having an air vent passage opening at its ends into the cap and into the crank case, respectively, a tube in said case and fixed to the shaft at said end journal, said tube having a valve seat therein and opening in said passage, and a valve in said tube and being automatically unseated by centrifugal forces set up on rotation of the crank.

7. In a piston actuated pneumatic tool, the combination with a crank case having a tubular extension at one end, of a crank shaft in said crank case and having an end journal in said extension, a cap closing said extension and provided with one or more air outlet ports, said end journal having an air vent passage opening at its ends to the atmosphere and to the interior of the crank case, respectively, a thrust plate over the outer end of said end journal and held stationary by said cap, a tube carried by said plate and extending into the passage in said end journal, a second tube in said case and fixed to the crank shaft at the end journal, said tube having a valve seat therein and opening into said passage, and a valve in said second tube and being automatically unseated by centrifugal forces set up on rotation of said crank shaft.

8. In a piston actuated pneumatic tool, the combination with a crank case having a tubular extension at one end, of a crank shaft in said case and having an end journal in said extension, an antifriction bearing between the extension and the end journal, a cap closing the outer end of the extension and having one or more air outlet ports, a thrust plate held against the bearing by said cap, and means for venting the case through the end journal embracing an air outlet passage in the end journal and opening at one end into the crank case and at the other end into said cap through said plate, and a valve for controlling said passage, said valve being carried by said shaft and being automatically unseated by centrifugal forces set up on rotation of said shaft.

9. In a piston actuated pneumatic tool, the combination with a crank case, of a crank shaft therein, and means including a valve for venting the crank case through the crank shaft, said valve being opened by centrifugal forces set up on the rotation of the crank shaft when the tool is held in any position wherein gravity tends to close the valve.

10. In a piston actuated pneumatic tool, the combination with a crank case, of a crank shaft in said case and having its ends journaled therein, a drill bit connected with one end of said crank shaft, and means for venting the crank case through the other end thereof, said means including a valve being opened by centrifugal forces set up on the rotation of the crank shaft when the tool is held in any position wherein gravity tends to close the valve.

11. In a piston actuated pneumatic tool, the combination with a crank case, of a crank shaft in said case and having an end journal supported therein, a connecting rod connected with said shaft adjacent said end journal, said end journal having an air outlet passage having its ends opening to the atmosphere and to the case, respectively, a tube in the crank case between the end journal and connecting rod and fixed to the shaft at an inclination thereto, said tube having a valve seat therein and opening into said passage, and a valve in said tube and being automatically unseated by centrifugal forces set up on the rotation of said crank shaft.

In testimony that we claim the foregoing as our invention, we affix our signatures, this 5th day of November, 1923.

AXEL LEVEDAHL.
REINHOLD A. NORLING.